No. 834,530. PATENTED OCT. 30, 1906.
S. MATTHES.
NUT LOCK.
APPLICATION FILED MAY 1, 1905.
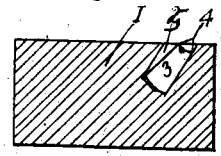
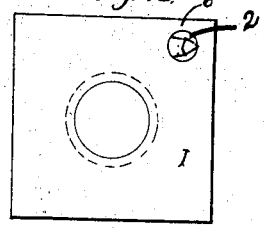
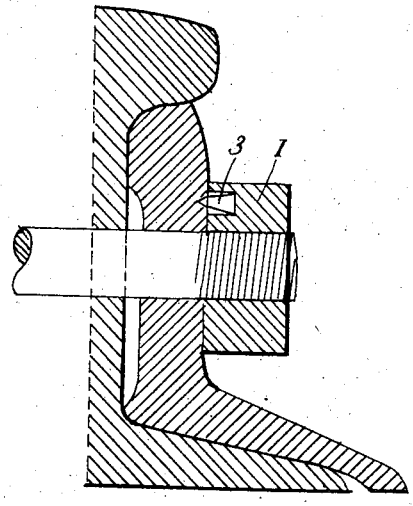
Witnesses
Victor Stavenik
William Matthes
Inventor
Samuel Matthes
By
John H. Boss
Attorney

UNITED STATES PATENT OFFICE.

SAMUEL MATTHES, OF MANSFIELD, OHIO.

NUT-LOCK.

No. 834,530. Specification of Letters Patent. Patented Oct. 30, 1906.

Application filed May 1, 1905. Serial No. 258,165.

*To all whom it may concern:*

Be it known that I, SAMUEL MATTHES, a citizen of the United States of America, and a resident of Mansfield, Richland county, Ohio, have invented certain new and useful Improvements in Nut-Locks, of which the following is a specification.

The objects of my invention are, first, to provide a means of securely locking a nut and keeping it locked in close contact with the surface it is drawn up against, so as to prevent the nut from turning off or becoming loose from vibration or other causes incident to its practical application in the construction of mechanical devices and machines; second, to construct a simple and efficient locking mechanism. I attain these and other objects by the mechanism illustrated in the accompanying drawings, in which—

Figure 1 is a cross-sectional view of the rail, fish-plate, nut, and lock. Fig. 2 is a top view of a nut, showing the point of locking-pin projecting above the surface. Fig. 3 is a cross-sectional side view of a nut, showing an inclined aperture with tapered locking-pin inserted therein.

Referring to the drawings, 1 indicates a sectional view of an ordinary nut, showing the point of the locking-pin in contact with the fish-plate. A circular aperture 2 is formed in the face of the nut at an incline with its face. I prefer to locate the aperture in the corner of the nut, as is shown in Fig. 2 of the drawings, leaving a margin of sufficient strength to resist the strain incident to tightening the nut.

It will be noted that the depth of the aperture is about one-half the thickness of the nut. I provide a tapered locking-pin 3, which is inserted in the aperture, as shown in Fig. 3. The point 4 is adapted to project over the surface of the face of the nut, as shown in Fig. 3. One side of the tapered pin when the nut is being screwed up is adapted to lie adjacent to one side of the wall of the aperture, leaving a space 5, and as the nut is turned up and brought in contact with the surface of a fish-plate or other surface a slight impression is made in said surface by the point of the pin. The pin is tempered, so that when it is brought in contact with the surface it will not wear the pin, but will embed itself in the surface which it is forced in contact with by the tightening of the nut. It will be observed that this leaves the point embedded in the surface when the nut is tightened.

The tendency of the nut to loosen or turn back is prevented by the pin when the nut is turned back. The point of the pin is forced to embed in the surface more or less as it pivots on the bottom of the aperture, and as the nut is turned back it forces the point deeper into the surface. The pin pivots on the bottom of the aperture at an incline with the surface and as the nut starts to turn back the point of the pin is made to project to a greater extent above the surface as the nut is screwed up.

In order to prevent the pin from dropping out, the corner of the nut is upset, closing the aperture slightly. The nut can be tightened at any time; but it is absolutely prevented by contact of the point against the surface from becoming loose.

I do not confine myself to the use of one pin, as it is obvious that two or more pins can be used with like effect.

Having fully described my invention, what I claim, and desire to secure by Letters Patent, is—

A nut-lock comprising a nut having a circular aperture inclined with the face of the nut and drilled partially through from the face leaving the end closed to provide a support, a tapered pin inserted in said circular aperture with the base resting on said support leaving the small end projecting over the face with a circular space surrounding the small end of the pin, said pin having a hardened upper portion to contact with the face of the fish-plate whereby said pin pivots on the bottom of the circular aperture when brought in contact with the face of the fish-plate.

Signed at Mansfield, Ohio, this 26th day of April, 1905.

SAMUEL MATTHES.

Witnesses:
  JOHN H. COSS,
  WILLIAM MATTHES.